Nov. 18, 1924.
W. L. ADAMS
1,515,716
SUSPENSION FOR AUTOMOBILES
Filed June 30, 1924  2 Sheets-Sheet 1
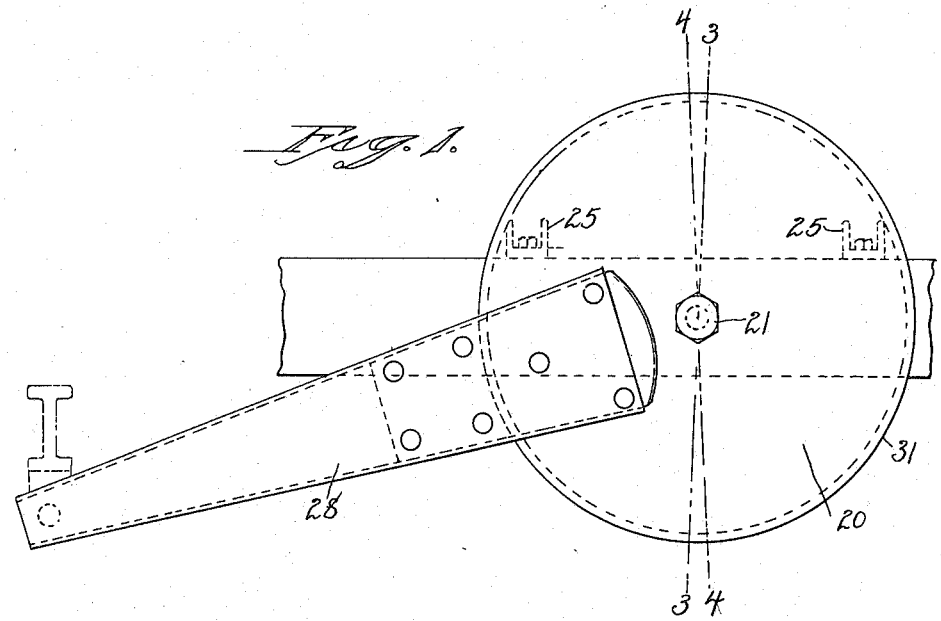
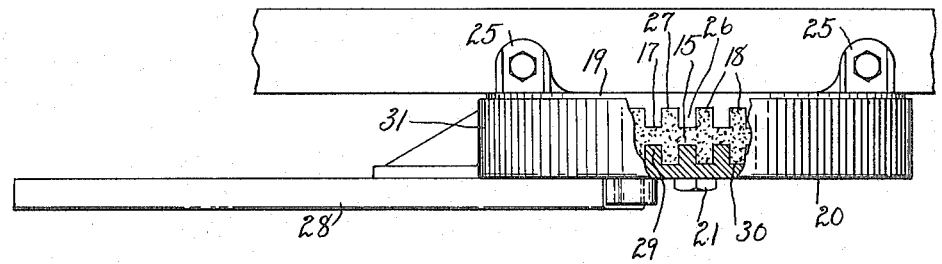
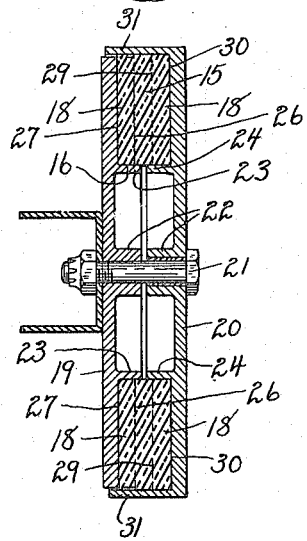
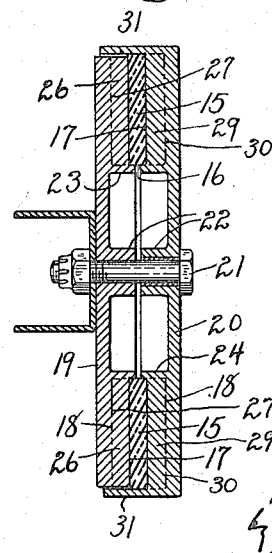

Nov. 18, 1924.
W. L. ADAMS
SUSPENSION FOR AUTOMOBILES
Filed June 30, 1924    2 Sheets-Sheet 2
1,515,716
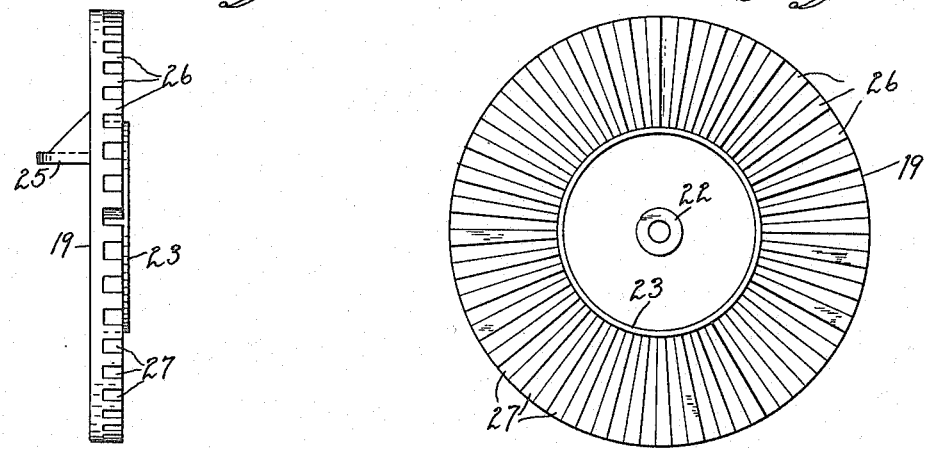
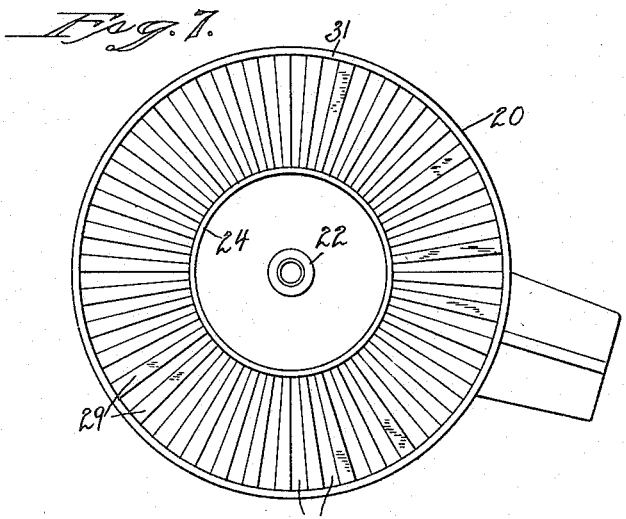
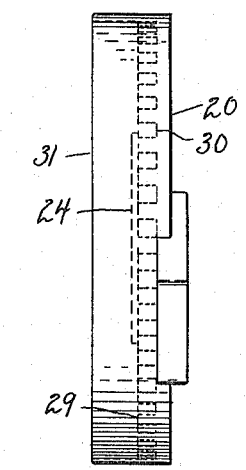
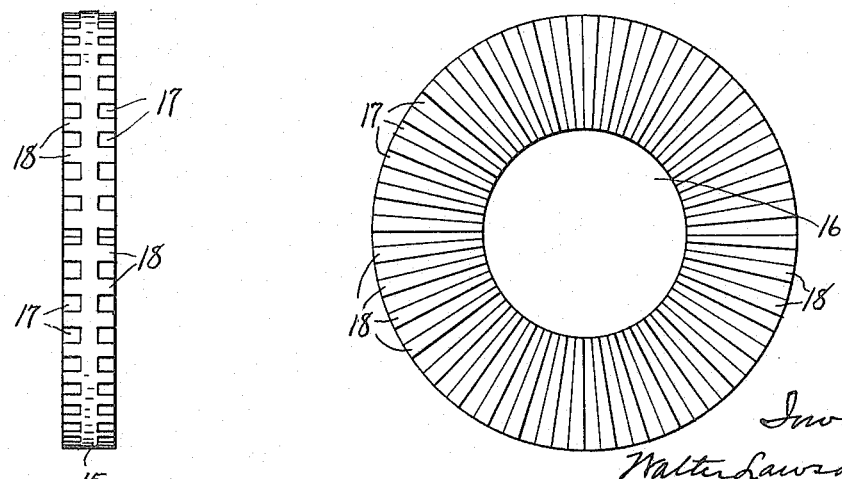
Inventor.
Walter Lawson Adams
by Seymour & Earle
Attys Patented Nov. 18, 1924.

1,515,716

UNITED STATES PATENT OFFICE.

WALTER L. ADAMS, OF NEW HAVEN, CONNECTICUT, ASSIGNOR TO ADAMS MOTORS CORPORATION, OF NEW HAVEN, CONNECTICUT, A CORPORATION.

SUSPENSION FOR AUTOMOBILES.

Application filed June 30, 1924. Serial No. 723,229.

*To all whom it may concern:*

Be it known that I, WALTER LAWSON ADAMS, a subject of the King of Great Britain, residing at New Haven, in the county of New Haven and State of Connecticut, have invented a new and useful Improvement in Suspensions for Automobiles; and I do hereby declare the following, when taken in connection with the accompanying drawings and the characters of reference marked thereon, to be a full, clear, and exact description of the same, and which said drawings constitute part of this application, and represent, in—

Fig. 1 a side view of a suspension constructed in accordance with my invention.

Fig. 2 a plan view of the same, partly broken away.

Fig. 3 a sectional view on the line 3—3 of Fig. 1.

Fig. 4 a sectional view on the line 4—4 of Fig. 1.

Fig. 5 an edge view of the fixed plate, detached.

Fig. 6 an inner face view of the same.

Fig. 7 an inner face view of the movable plate.

Fig. 8 an edge view of the same.

Fig. 9 an edge view of the block, detached.

Fig. 10 a face view of the same.

This invention relates to improvement in suspensions for automobiles. A great deal of automobile trouble is caused by the wear of shackles and the necessity of greasing them and changing bearings to prevent rattles and squeaks. The object of this invention is to provide a suspension device which will not need lubrication and which, when once attached, will maintain its active qualities indefinitely, and the invention consists in the construction as hereinafter recited in the claims.

In carrying out my invention, I employ a block 15 of rubber, formed with a central opening 16, and on opposite sides with radial grooves 17 forming radial ribs 18. These blocks are placed between a fixed plate 19 and a movable plate 20, arranged parallel with each other and connected together by a bolt 21 passing through inwardly-projecting centrally-arranged bosses 22. These plates are also formed with angular collars 23 and 24 which respectively extend into the central part of the block 15, by which it is supported. The plate 19 is provided with lugs 25 by which it may be secured to a fixed part of the car, and beyond the collars 23, the inner face of the plate is formed with a series of radial ribs 26 and grooves 27 to receive the ribs and grooves of the block 15. The movable plate 20 is attached to an arm 28, the outer end of which is connected with an axle, either front or rear, of a car. This plate is also formed, on its inner face, beyond the ring 24, with radial ribs 29 and grooves 30, like the ribs 26 and grooves 27 on the plate 19, and to engage with the radial ribs 18 and grooves 17 of the block 15. Preferably, the plate 20 will be formed with an annular flange 31, which will extend over the periphery of the block 15 and over the edge of the plate 19, so that the block 15 is housed between the plates.

The rubber block thus located between the two plates will yield under movement of those plates, but without the wearing of the metal parts, and these metal parts are so separated that they cannot come in contact with each other to produce rattle or friction. Should occasion require, these rubber blocks may be readily renewed, altho they are so gripped and located in position that they will withstand the wear naturally imposed upon them for a long period.

I claim:

1. A suspension, comprising a rubber block formed on opposite sides with radial ribs and grooves and two plates having corresponding ribs and grooves to engage with the grooves and ribs of the block.

2. A suspension, comprising a block of rubber in the form of a ring, with radial ribs and grooves on opposite sides, a fixed plate and a movable plate connected with opposite sides of the said block, and formed with ribs and grooves to receive the ribs and grooves of the block, means for holding the plates in engagement with said block, and means for mounting said plates.

3. A suspension, comprising a rubber block formed with a central opening and with radial ribs and grooves on opposite sides, two plates, each formed with inwardly-projecting collars to enter the opening in the block, said plates formed with radial ribs and grooves engaging with the ribs and grooves in the block, means for holding the plates in engagement with said block, and one of said plates formed with an annular flange extending over the edge of the block.

In testimony whereof, I have signed this specification in the presence of two subscribing witnesses.

W. L. ADAMS.

Witnesses:
FREDERIC C. EARLE,
MALCOLM P. NICHOLS.